United States Patent
Kim et al.

(10) Patent No.: US 11,051,219 B2
(45) Date of Patent: *Jun. 29, 2021

(54) METHOD AND APPARATUS FOR CONTROLLING MOBILITY FOR CELL HAVING SMALL CELL SERVICE AREA IN MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Kyeongin Jeong, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/199,075

(22) Filed: Nov. 23, 2018

(65) Prior Publication Data

US 2019/0098543 A1    Mar. 28, 2019

Related U.S. Application Data

(63) Continuation of application No. 14/763,003, filed as application No. PCT/KR2014/000720 on Jan. 24, 2014, now Pat. No. 10,142,897.

(30) Foreign Application Priority Data

Jan. 25, 2013 (KR) .......................... 10-2013-0008586

(51) Int. Cl.
*H04L 5/00* (2006.01)
*H04W 36/04* (2009.01)
(Continued)

(52) U.S. Cl.
CPC ....... *H04W 36/04* (2013.01); *H04W 36/0016* (2013.01); *H04W 36/0083* (2013.01);
(Continued)

(58) Field of Classification Search
None
See application file for complete search history.

(56) References Cited

U.S. PATENT DOCUMENTS

| | | | |
|---|---|---|---|
| 2005/0026619 | A1 | 2/2005 | Jha |
| 2006/0099952 | A1 | 5/2006 | Prehofer |

(Continued)

FOREIGN PATENT DOCUMENTS

| | | |
|---|---|---|
| CN | 101505514 A | 8/2009 |
| CN | 102870464 A | 1/2013 |

(Continued)

OTHER PUBLICATIONS

Korean Office Action dated Aug. 6, 2019, issued in Korean Application No. 10-2013-0008586.

(Continued)

*Primary Examiner* — Sithu Ko
(74) *Attorney, Agent, or Firm* — Jefferson IP Law, LLP (57) ABSTRACT

The present invention relates to a method and an apparatus for controlling mobility for a cell having a small cell service area in a mobile communication system. A method for controlling mobility of a terminal in a mobile communication system, according to one embodiment of the present invention, can comprise the steps of: performing, by the terminal, a measurement operation; transmitting a measurement result to a base station; determining whether or not a target cell for handover is a cell for which handover is allowed; and skipping the handover if the target cell for handover is the cell for which handover is not allowed. According to one embodiment of the present invention, (Continued)

when the small cells are arranged sparsely or in the form of a cluster within a service area of a macro cell, the possibility of a handover failure can be reduced, and if a radio link failure occurs when handover is omitted, re-connection can be performed quickly by the terminal.

8 Claims, 11 Drawing Sheets

(51) Int. Cl.
H04W 76/10 (2018.01)
H04W 36/00 (2009.01)
H04W 36/32 (2009.01)

(52) U.S. Cl.
CPC . *H04W 36/0085* (2018.08); *H04W 36/00835* (2018.08); *H04W 36/32* (2013.01); *H04W 76/10* (2018.02)

(56) References Cited

U.S. PATENT DOCUMENTS

| | | | |
|---|---|---|---|
| 2008/0261600 A1* | 10/2008 | Somasundaram | H04W 36/0079 455/436 |
| 2009/0316586 A1* | 12/2009 | Yi | H04W 74/002 370/242 |
| 2010/0113009 A1 | 5/2010 | Jeong et al. | |
| 2011/0080825 A1* | 4/2011 | Dimou | H04W 36/30 370/216 |
| 2011/0244862 A1 | 10/2011 | Inumaru | |
| 2011/0263262 A1* | 10/2011 | Min | H04W 36/32 455/438 |
| 2011/0300896 A1 | 12/2011 | Wang et al. | |
| 2012/0069732 A1 | 3/2012 | Xu et al. | |
| 2012/0087338 A1* | 4/2012 | Brandt | H04W 36/0011 370/331 |
| 2012/0178454 A1 | 7/2012 | Kim et al. | |
| 2012/0214489 A1 | 8/2012 | Koo et al. | |
| 2013/0023302 A1* | 1/2013 | Sivanesan | H04W 36/32 455/525 |
| 2013/0059587 A1 | 3/2013 | Lindoff et al. | |
| 2013/0260745 A1 | 10/2013 | Johansson et al. | |
| 2014/0011502 A1 | 1/2014 | Moilanen et al. | |
| 2014/0031041 A1* | 1/2014 | Jung | H04W 36/30 455/437 |
| 2014/0038616 A1* | 2/2014 | Burbidge | H04W 36/18 455/442 |
| 2014/0050197 A1 | 2/2014 | Legg et al. | |
| 2014/0066074 A1 | 3/2014 | Folke et al. | |
| 2014/0148174 A1 | 5/2014 | Teyeb et al. | |
| 2014/0335870 A1 | 11/2014 | Yilmaz et al. | |
| 2015/0223233 A1* | 8/2015 | Seo | H04L 5/0048 370/329 |

FOREIGN PATENT DOCUMENTS

| | | |
|---|---|---|
| EP | 2 403 198 A1 | 1/2012 |
| JP | 2011244208 A | 12/2011 |
| KR | 10-2012-0030946 A | 3/2012 |
| KR | 10-2012-0069065 A | 6/2012 |
| WO | 97/31496 A1 | 8/1997 |
| WO | 2012/150880 A1 | 8/2012 |

OTHER PUBLICATIONS

Korean Office Action dated Sep. 6, 2019, issued in Korean Application No. 10-2013-0008586.
Chinese Office Action with English translation dated Dec. 14, 2020; Chinese Appln. No. 201910353980.6.

* cited by examiner

METHOD AND APPARATUS FOR CONTROLLING MOBILITY FOR CELL HAVING SMALL CELL SERVICE AREA IN MOBILE COMMUNICATION SYSTEM

CROSS-REFERENCE TO RELATED APPLICATION(S)

This application is a continuation application of prior application Ser. No. 14/763,003, filed on Jul. 23, 2015, which was the National Stage entry of International application number PCT/KR2014/000720, filed on Jan. 24, 2014, which claims the benefit of a Korean patent application filed on Jan. 25, 2013 in the Korean Intellectual Property Office and assigned Ser. No. 10-2013-0008586, the entire disclosure of which is hereby incorporated by reference.

TECHNICAL FIELD

The present invention relates to a method and an apparatus for effectively controlling the mobility for a cell having a small cell service area in a mobile communication system.

BACKGROUND

In general, mobile communication systems have been developed to provide communication while securing mobility of users. With the rapid development of technologies, such mobile communication systems have reached a stage of providing high-speed data communication services as well as voice communication. Recently, standard operation from 3GPP to Long Term Evolution-Advanced (LTE-A) is in progress as one of next generation mobile communication systems. LTE-A was aimed at standardization completion in late 2000, and is a technology having a higher transmission speed than the currently provided data transmission rate and realizing high speed packet-based communication.

As the 3GPP standard evolves, a method for easily optimizing a wireless network as well as a method for raising a communication speed is under discussion. In a conventional mobile communication system, a cell having a small-sized service area is frequently utilized for increasing capacity and reducing shadow areas. Because of a small-sized service area, many problems occur, such as frequent failure of handover. Nevertheless, application of a system variable which is suitable for a small-sized service area or development of operation mechanism is not specifically prepared.

SUMMARY

Technical Problem

The present invention is proposed for solving the problems mentioned above, and is to provide a method and an apparatus for effectively controlling the mobility for a cell having a small cell service area in a mobile communication system.

The technical subjects pursued in the present invention may not be limited to the above mentioned technical subjects, and other technical subjects which are not mentioned may be clearly understood, through the following descriptions, by those skilled in the art of the present invention.

Technical Solution

In order to achieve the purpose, a method for controlling mobility of a user equipment (UE) in a mobile communication system according to one embodiment of the present invention includes: performing a measurement operation by the UE; transmitting a result of the measurement operation to an Evolved Node B (eNB); determining whether a cell to be handed over is a cell to which a handover is not allowed; and skipping the handover when the cell to be handed over is the cell to which the handover is not allowed.

Further, the UE according to one embodiment of the present invention may include: a transmission/reception unit for transmitting and receiving a signal to/from the eNB; and a control unit for performing a measurement operation, transmitting the measurement information result to the eNB, determining whether a cell to be handed over is a cell to which a handover is skipped, and controlling to skip the handover when the cell to be handed over is the cell to which the handover is skipped.

Advantageous Effects

By using the proposed method, the probability of failure of a handover can be reduced when small cells are sparsely arranged or densely arranged within a service area of a macro cell, and a UE can promptly perform re-connection when failure of a radio link occurs while skipping a handover.

Effects obtainable from the present invention may not be limited to the above mentioned effects, and other effects which are not mentioned may be clearly understood, through the following descriptions, by those skilled in the art of the present invention.

DETAILED DESCRIPTION

In the following description of the present disclosure, a detailed description of known configurations or functions incorporated herein will be omitted when it is determined that the detailed description may make the subject matter of the present disclosure unclear. Hereinafter, embodiments of the present disclosure will be described with reference to the accompanying drawings. The terms which will be described below are terms defined in consideration of the functions in the present disclosure, and may be different according to users, intentions of the users, or customs. Accordingly, the definitions of the terms should be made on the basis of the overall context of the embodiments.

The present invention relates to a method and an apparatus for controlling the mobility for a cell having a small cell service area in a mobile communication system. Prior to describing the present invention, a method for arranging a cell having a small cell service area will be described hereinafter. In this case, the small cell service area may represent a case where a cell has a cell service area smaller than or equal to a predetermined size. In the description of the present invention, a cell having a small cell service area is referred to as "small cell".

Figure 1:
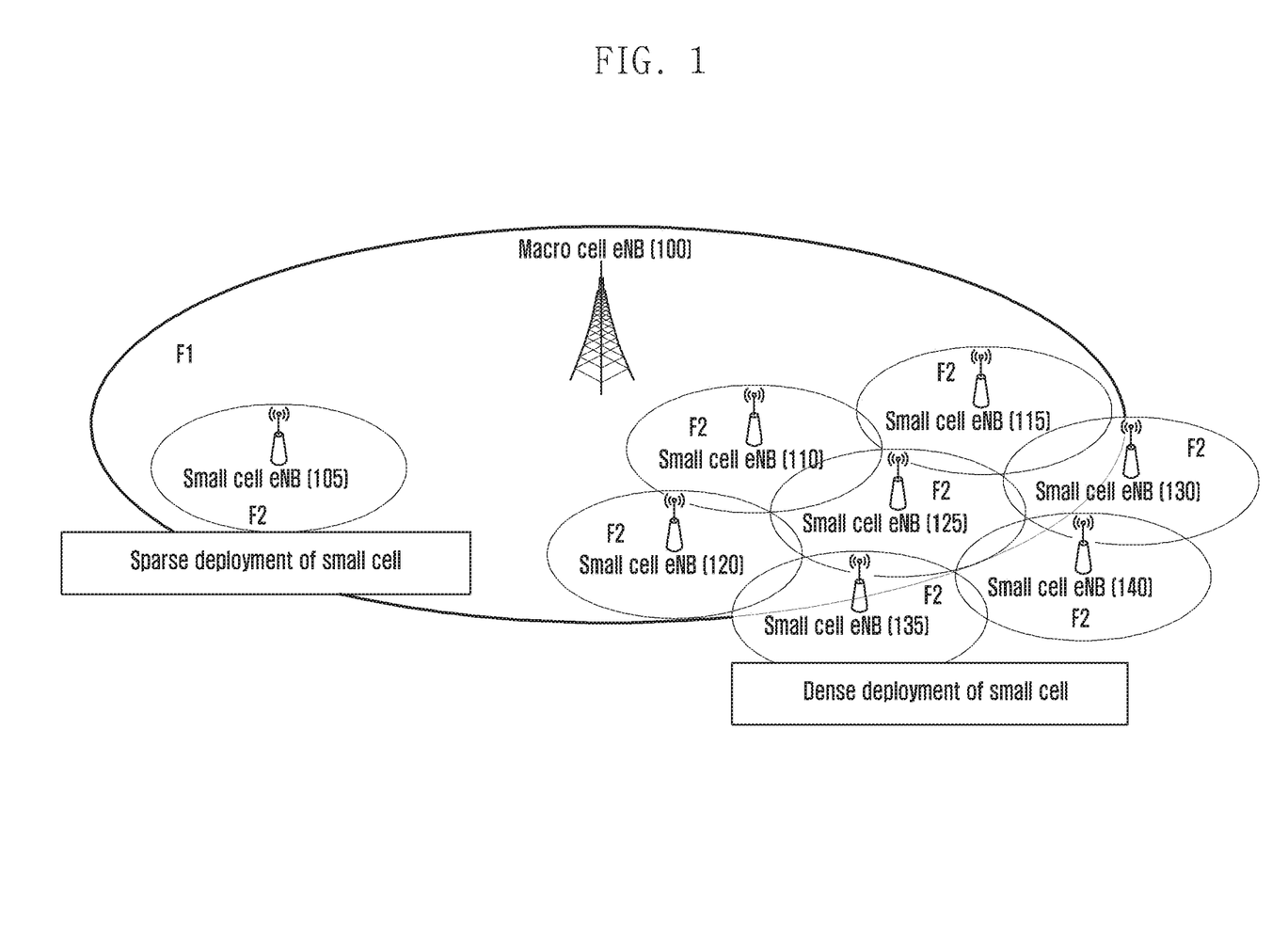
FIG. 1 is a view for describing a small cell arrangement scheme.

FIG. 1 is a view for describing a small cell arrangement scheme. A first arrangement scheme is a method in which a small cell 105 is sparsely arranged within a service area of a macro cell 100. Such an arrangement is useful for covering a hot spot area in which an intensive traffic occurs or a service shadow area. Further, depending on whether the small cell uses the same frequency band as a macro cell or another frequency band, intra-frequency handover or inter-frequency handover occurs when a UE moves from the macro cell to the small cell or from the small cell to the macro cell. In the arrangement scheme, the UE can pass a small cell at a relatively fast speed. Since a service area of a small cell is relatively narrow, several handovers should be performed during a short time in which the UE passes a small cell. This may cause a probability of failure of handover to increase.

In another arrangement scheme, a plurality of small cells 110, 115, 120, 125, 130, 135, and 140 are densely arranged, while being adjacent each other. This can be applied when much traffic occurs in a little broader area. The small cells may exist within a service area of a macro cell, and a service area of the macro cell can be completely covered by only a small cell. Therefore, the small cells may not exist within a service area of the macro cell. All the small cells may use the identical frequency band. In this case, handover within the same frequency occurs when the UE moves between the small cells. A UE can move quickly in a service area of the small cells, and the UE passes service areas of several small cells during a short time. This implies that the UE may move to another cell even before handover to a configured target cell is completed, which means that the handover may fail in a moment. In the present invention, methods for improving mobility of a UE will be gone through in consideration of each of the two arrangement scheme scenarios described earlier.

Embodiment 1

Figure 2:
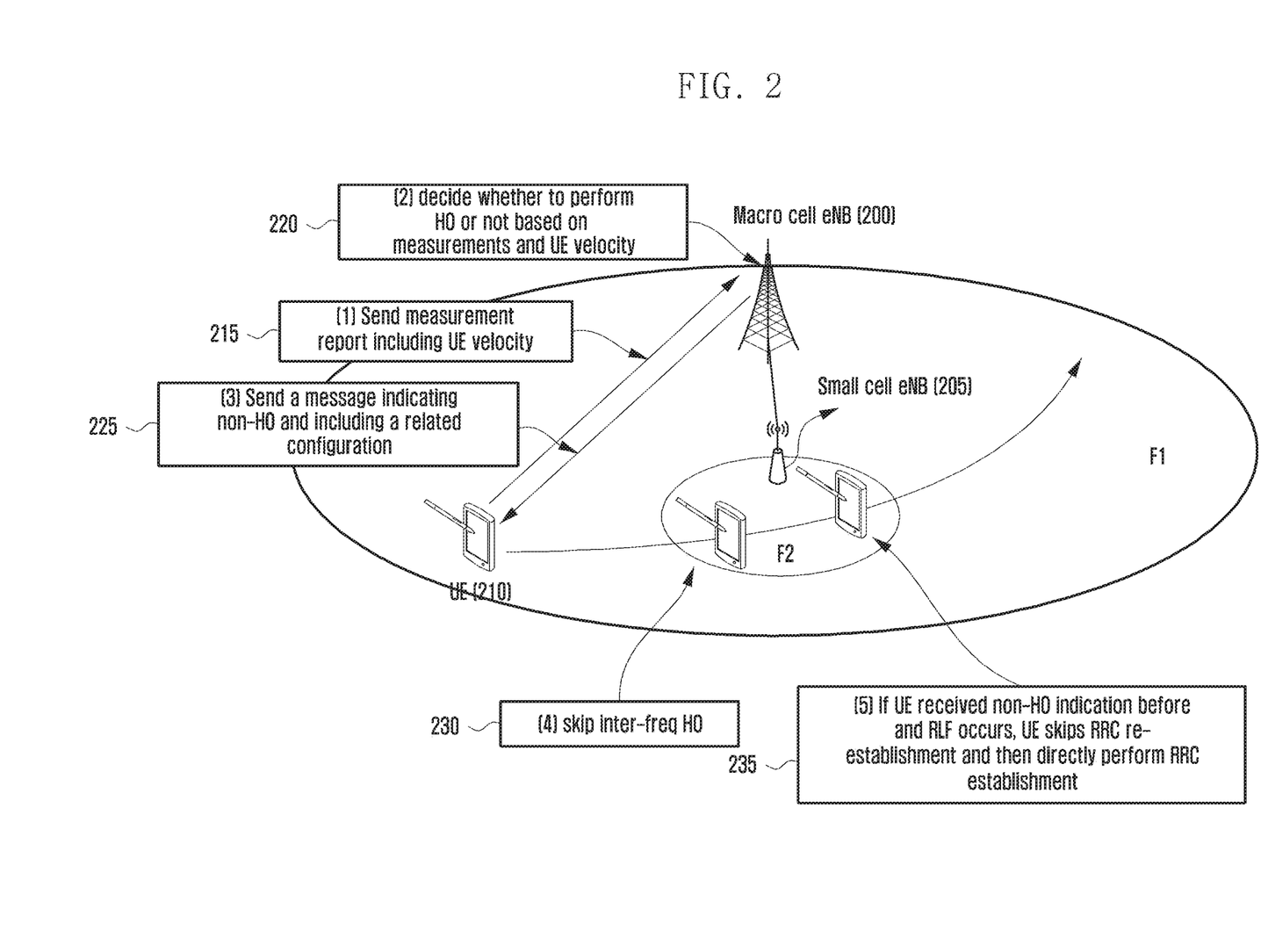
FIG. 2 is a view for describing a method for reducing a probability of failure of handover in a scenario in which a small cell is sparsely arranged within a service area of a macro cell.

FIG. 2 is a view for describing a method for reducing a probability of failure of handover in a scenario in which small cells 205 are sparsely arranged within a service area of a macro cell 200. When a UE 210 passes a small cell while moving at a high speed, the time for which the UE 210 stays in a service area of the small cell would be short. Thus, skipping a handover is more suitable for stably maintaining communication rather than forcedly performing a handover to a small cell. The present embodiment proposes a method for skipping a handover. Further, the embodiment proposes a method for promptly performing re-connection when a Radio Link Failure (RLF) occurs while a handover is skipped.

The UE 210 reports measurement information including moving speed information of a UE and moving direction information of a UE to an eNB in step 215. The measurement information includes various information, such as signal intensity information of a serving cell and an adjacent cell (RSRP/RSRQ), Physical Cell Identifier (PCI) information of the adjacent cell and location information of a UE, as well as moving speed information of the UE and moving direction information of the UE. The measurement information report is preconfigured and triggered by an eNB, using an RRC Connection Reconfiguration message. On the basis of the measurement information transferred from a UE, a macro eNB 200 determines whether to hand over the UE to a small cell 205 in step 220. When it is determined that the handover is to be skipped, the macro eNB 200 exactly informs the UE 210 of an indicator indicating that the handover is skipped (referred to as "non-HO indicator" in the present invention) and configuration information which a UE is to apply within a service area of a small cell. The indicator may exactly include cell ID information of a small cell to which a UE should not perform a handover. The cell ID may be a PCI or a Cell Global Identifier (CGI). Further, the cell ID can be transmitted together with the indicator or from a serving eNB to a UE in the form of broadcasting in advance, or can be informed of autonomously. The indicator can be limited to being valid during a predetermined time or when a specific condition is satisfied. In step 230, a UE which has received the indicator may not perform a handover although a small cell satisfies a condition as a handover target. The macro eNB 200 can provide configuration information, which is applied only when a UE passes a small cell, as well as an indicator, as an option. For example, configuration information provided together with an indicator may be a new N310 and/or T310 value, and the like. The N310 and T310 will be described in detail hereinafter. Since it is desirable to apply new configuration information to the UE only while the UE is within a small cell, configuration information of the UE should be restored to the original configuration information after a predetermined time passes. Therefore, after the passage of a particular time after application of a new configuration, a process in which the UE restores the original configuration information by itself or an eNB reconfigures the configuration information to the original configuration information is needed. For example, when a signal intensity of a small cell, which is measured by the UE, is weakened under a particular intensity, the provided configuration information is deleted and the original configuration information is applied again. Otherwise, an eNB can reconfigure the configuration information for the UE on the basis of the measurement information reported by the UE. When the reconfiguration is completed, it is considered that the non-HO indicator is not valid any more.

When a macro cell and a small cell use the identical frequency band, the UE does not perform a handover to a small cell. Thus, the UE receives a big interference signal from the small cell when the UE passes a service area of the small cell. However, the time for which the UE stays in a small cell is short. Thus, a condition for declaration of an RLF can be somewhat mitigated so that an unnecessary increase in signaling for re-connection can be prevented. A N310 is a counter value such as an upper layer of the UE. When a Radio Resource Control (RRC) receives an indication marked 'out of sync' for a duration as long as the value of N310 from the physical layer of the UE, the UE drives a T310 timer. Before the T310 timer is expired, when the RRC has received an indication marked 'in-sync' N311 times from the physical layer or when the RRC does not perform a handover or re-establishment process, an RLF is declared. Therefore, when the value of the N310 or the value of the T310 timer is increased, the declaration of an RLF can be delayed. Although an actual interference environment becomes poor, the time for which the UE stays in a small cell is not long. Thus, this can be sufficiently overcome through a Hybrid ARQ (HARQ) or ARQ retransmission method, and the like. When a macro cell and a small cell use different frequency bands, the inference problem described earlier does not exist. Therefore, new configuration information will be provided as an option.

When a macro cell and a small cell use an identical frequency band, an RLF may be declared although new configuration information is applied. In this case, the UE will perform re-establishment according to the prior art. But, since a macro cell does not indicate that the UE is handed over to a small cell, the small cell does not have situation information (context) regarding the UE. In general, when the UE requests re-establishment to a cell which does not have situation information, the cell denies the re-establishment request and the UE switches over to standby mode. Therefore, performing, by the UE, re-establishment through not a cell to be handed over following an RLF but a small cell in the above-described scenario is an unnecessary operation. Therefore, in the present invention, when the UE receives a non-HO indicator within a predetermined time before an RLF occurs and the RLF occurs within a small cell area, and the UE select a small cell as a new suitable cell, the UE performs an establishment process right away without performing a re-establishment process. When another cell other than a small cell is selected as a suitable cell, a re-establishment process is performed by the UE according to the prior art. Another cell other than a small cell also includes a previous serving macro cell. As described earlier, cell ID information of a small cell to which the UE should not perform a handover may be included together with a non-HO indicator. In this case, the UE can compare a cell ID of a suitable cell which is newly found after an RLF occurs with the ID and then determine whether to perform re-establishment.

Figure 3:
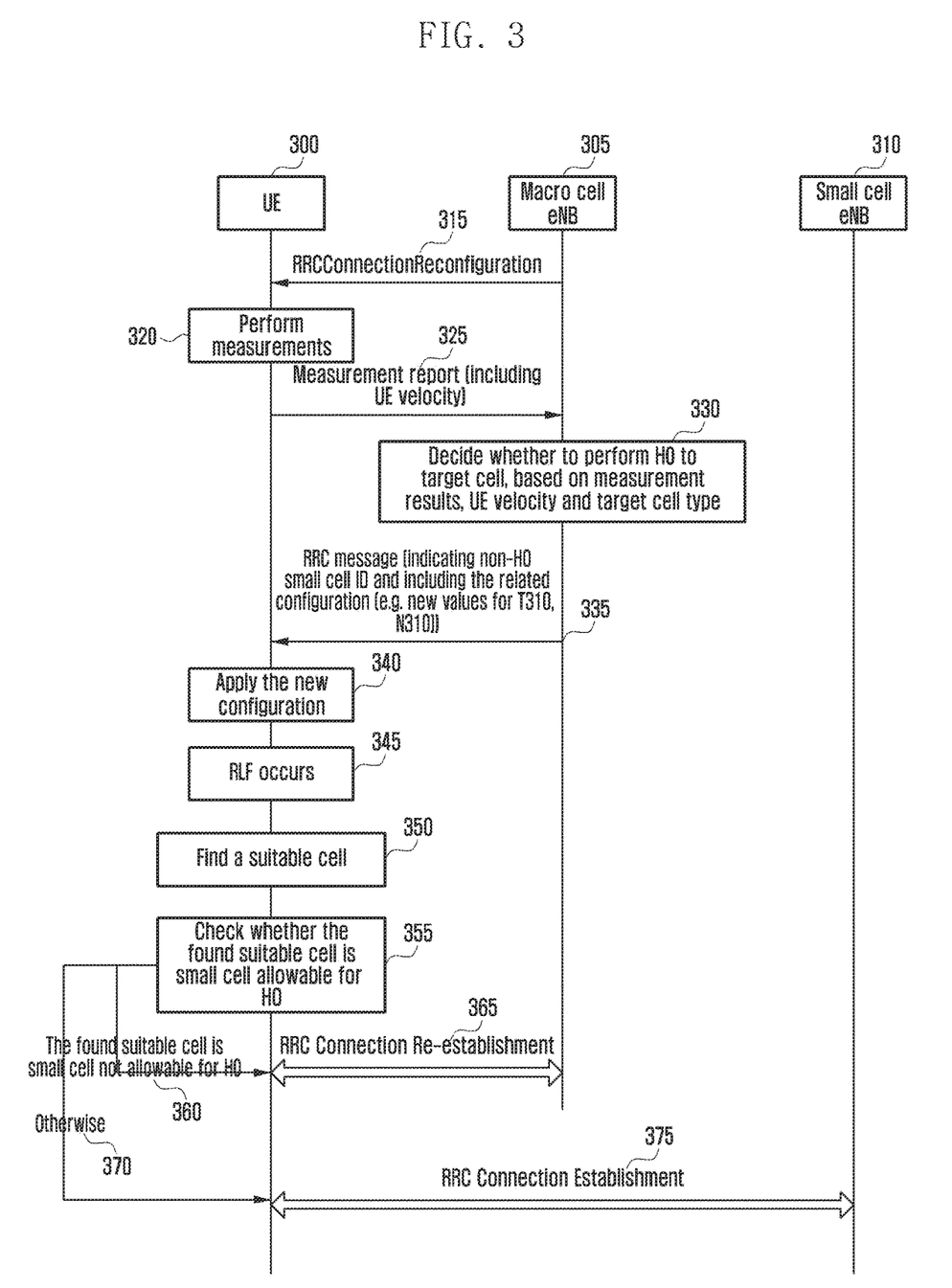
FIG. 3 is a view for describing an operation flow chart according to a first embodiment.

FIG. 3 is a view for describing an operation flow chart according to the first embodiment. A macro eNB 305 sends an RRC Connection Reconfiguration message, in order to order a UE 300 to measure neighboring cells. The UE which has received the message performs measurement for serving and neighboring cells on the basis of the information which the macro eNB has configured in step 320. The macro eNB can also instruct the UE to measure specific measurement information, i.e., moving speed and moving direction information of a UE. In step 325, the UE reports a result of the measurement to the macro eNB. The result of the measurement may also include moving speed and moving direction information of the UE. In step 330, the macro eNB determines whether to perform a handover to a small cell located nearby the UE, on the basis of the result of the measurement which the UE has reported. In this case, a moving speed of the UE, type information of neighboring cells, and the like can be considered. For example, when a moving speed of the UE is faster than a specific threshold value and a handover candidate of the UE is a cell having a small cell type, the eNB can determine to skip a handover. When the macro eNB determines not to hand over the UE to a neighboring small cell, although cell measurement information satisfies a handover performance condition, the macro eNB sends a predetermined RRC message to the UE in step 335. A predetermined RRC message may be an RRC connection reconfiguration message, wherein the message may include a non-HO indicator, a small cell ID forbidding handover, and configuration information to be applied to a service area of a small cell. In step 340, the UE 300 applies the configuration information. When an RLF occurs while the UE passes a service area of a small cell in step 345, the UE can find a suitable cell in step 350. In step 355, the UE determines whether a suitable cell which the UE has found is a small cell to which a handover is skipped. When the suitable cell is not a small cell 360 to which a handover is skipped, the UE transmits an RRC Connection Reestablishment Request message to the suitable cell in step 365. The suitable cell which has received the message performs a usual RRC Connection Reestablishment process. On the other hand, when the suitable cell is a small cell 370 to which a handover is skipped, the UE transmits an RRC Connection Request message without transmitting an RRC Connection Reestablishment Request message in step 375. The UE configures a Service Request Block (SRB) according to an RRC Connection Setup message which the UE has received from the small cell. The UE includes information such as an Evolved Cell Global Identifier (ECGI) of a previous serving cell in an RRC Connection Setup Complete message and then transmits the RRC Connection Setup Complete message to an eNB.

When the suitable cell is a previous serving cell, as another determination condition, the UE transmits an RRC Connection Reestablishment Request message to the suitable cell. Otherwise, the UE transmits an RRC Connection Request message to the suitable cell without transmitting an RRC Connection Reestablishment Request message to the suitable cell.

Figure 4:
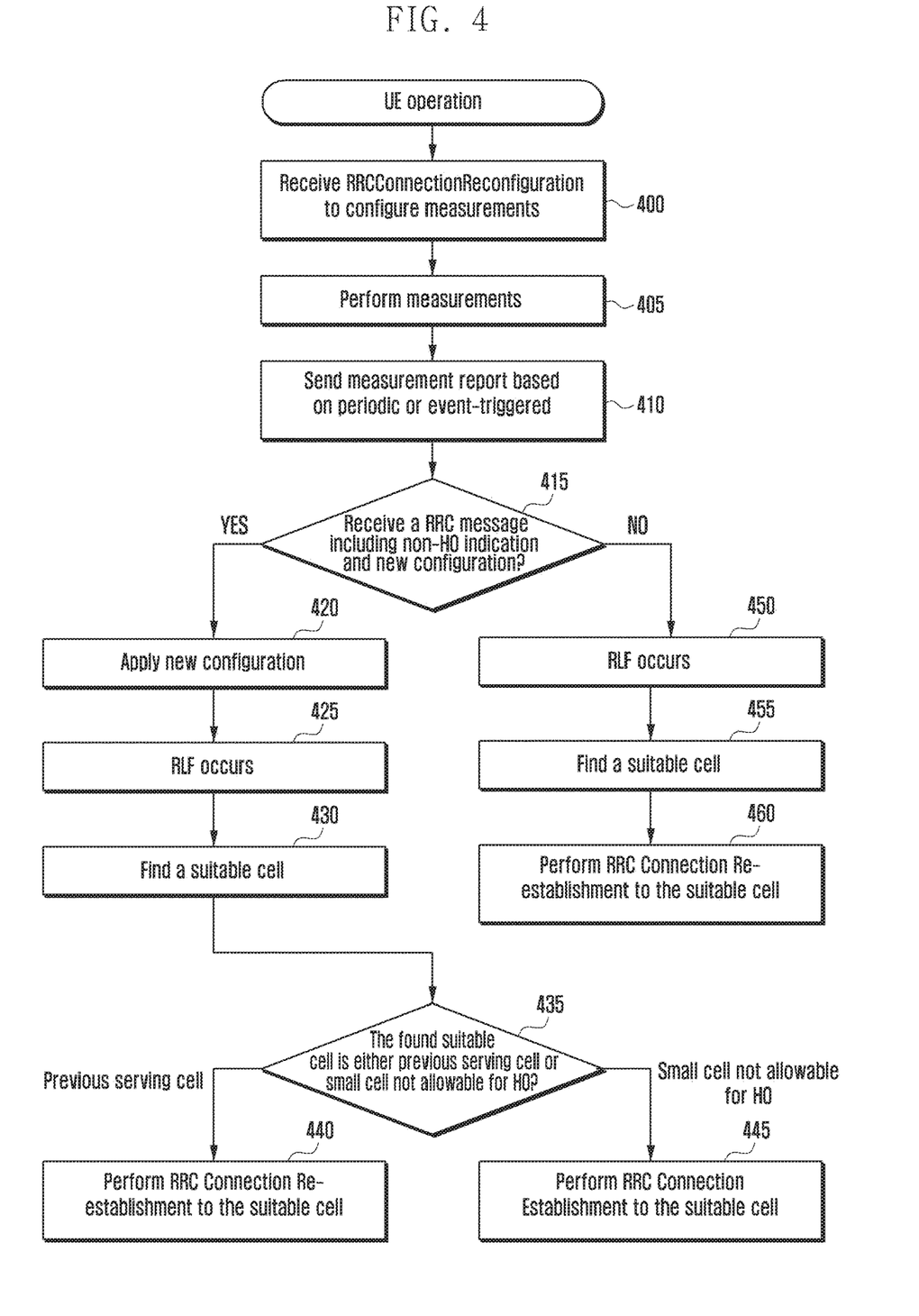
FIG. 4 is a view for describing operations of a UE according to the first embodiment.

FIG. 4 is a view for describing operations of a UE according to the first embodiment. In step 400, the UE receives an RRC Connection Reconfiguration message for configuring a measurement operation from an eNB. In step 405, the UE performs a measurement operation on the basis of the received configuration information. In step 410, the UE reports a result of the measurement operation to the eNB periodically or through an event trigger scheme. In step 415, the UE determines whether the UE has received a predetermined RRC message including a non-HO indicator from the eNB. The RRC message may include a cell ID and new configuration information of a small cell. When the UE receives a predetermined RRC message including the non-RRC message, the UE can apply new configuration information in step 420 and in step 415. When an RLF occurs in step 425, the UE can find a suitable cell in step 430. In step 435, the UE determines whether the found suitable cell is a small cell to which a handover is skipped. When the found suitable cell is not a small cell to which a handover is skipped as a result of the determination, the UE transmits an RRC Connection Reestablishment Request message to the suitable cell in step 440. When the found suitable cell is a small cell to which a handover is skipped, the UE transmits an RRC Connection Request message without transmitting an RRC Connection Reestablishment Request message in step 445. In step 415, when the UE does not receive a predetermined RRC message including a non-HO indicator from the eNB, the UE follows the conventional method. That is, an RLF occurs in step 450, and the UE finds one suitable cell in step 455. In step 460, the UE can transmit an RRC Connection Reestablishment Request message to the suitable cell.

Figure 5:
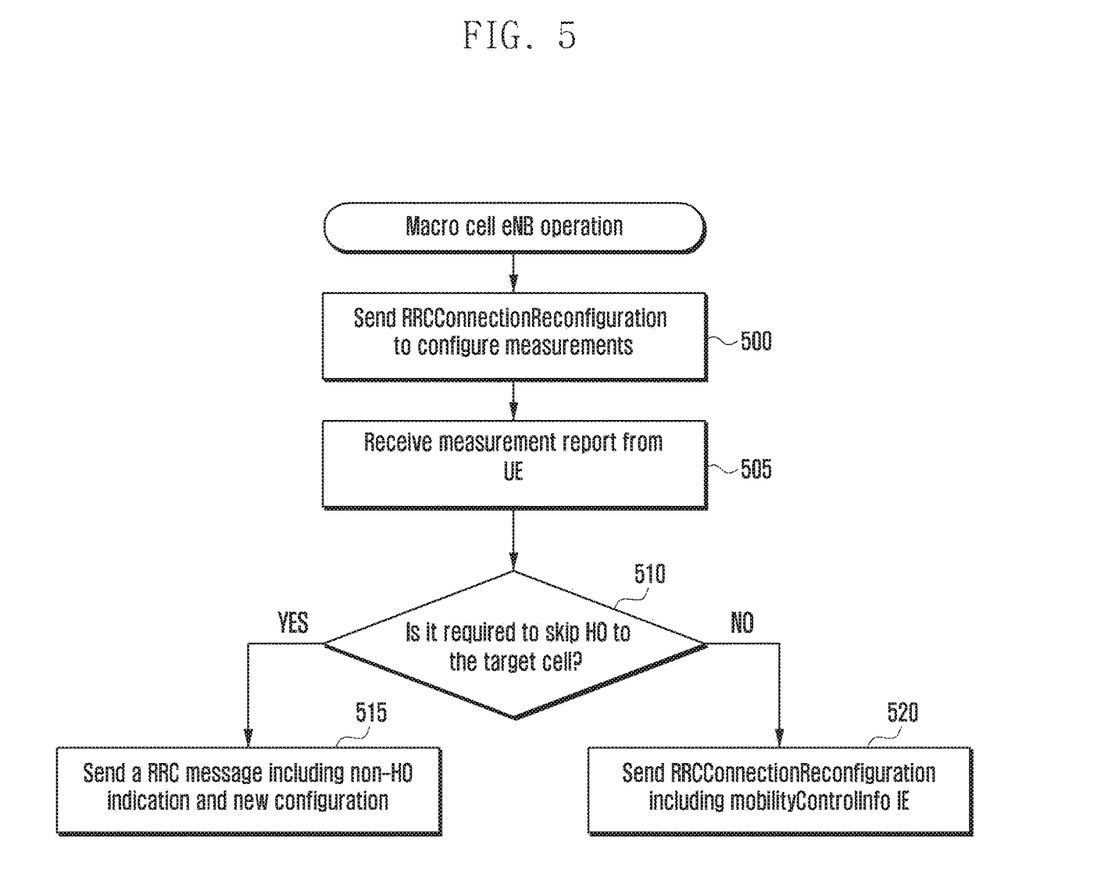
FIG. 5 is a view for describing operations of an eNB according to the first embodiment.

FIG. 5 is a view for describing operations of an eNB according to the first embodiment. In step 500, the eNB transmits an RRC Connection Reconfiguration message for ordering a particular UE to perform a measurement operation. The message includes configuration information necessary for a measurement operation. The configuration information may require moving speed and moving direction information of the UE. In step 505, the eNB receives a report for a result of the measurement from the UE. In step 510, the eNB determines whether to skip a handover to target cell on the basis the reported result of the measurement. Further, the eNB considers a cell type of a target cell which the eNB holds in advance, i.e., whether a target cell is a small cell, in order to determine whether to skip handover to the target cell. That is, the eNB can additionally consider a moving speed and moving direction of the UE and a cell type of a target cell, using the result of the measurement, and determine whether to perform a handover. When the eNB determines to skip a handover, the eNB can include a non-HO indicator, new configuration information, and the like in a determined RRC message and then transmit the determined RRC message to the UE in step 515. When the eNB determines to perform a handover, the eNB can include mobility Control Info IE needed for performing the handover and the like in an RRC Connection Reconfiguration message and then transmit the RRC Connection Reconfiguration message to the UE in step 520.

Embodiment 2

In a LTE technology, when an eNB does not configure a handover although a UE is in a situation in which the UE should actually perform a handover, the UE cannot perform a handover. That is, although the non-HO indicator described earlier is not newly defined, the eNB can control whether the UE performs a handover. Therefore, an operation regarding a case where a non-HO indicator is not newly defined will be described in the present embodiment. When the UE selects a small cell as a new suitable cell after an RLF occurs, a new operation of the UE is required for shortly performing an establishment process without performing a re-establishment process. That is, since a non-HO indicator or a cell ID of a small cell to which a handover is not allowed is not previously provided from the eNB, an additional operation of the UE is required for skipping a re-establishment process. Therefore, when predetermined conditions are satisfied, the UE can skip a re-establishment process for a small cell. For example, the following conditions can be considered.

Whether the UE is located within a small cell
Whether a speed of the UE is lower than a threshold value
Whether the small cell is an optimal cell
Whether a handover to the small cell has previously been triggered When all above conditions or some above conditions are satisfied, the UE exists within a small cell service area to which a handover is skipped and the UE determines an operation for skipping a re-establishment process.

Figure 6:
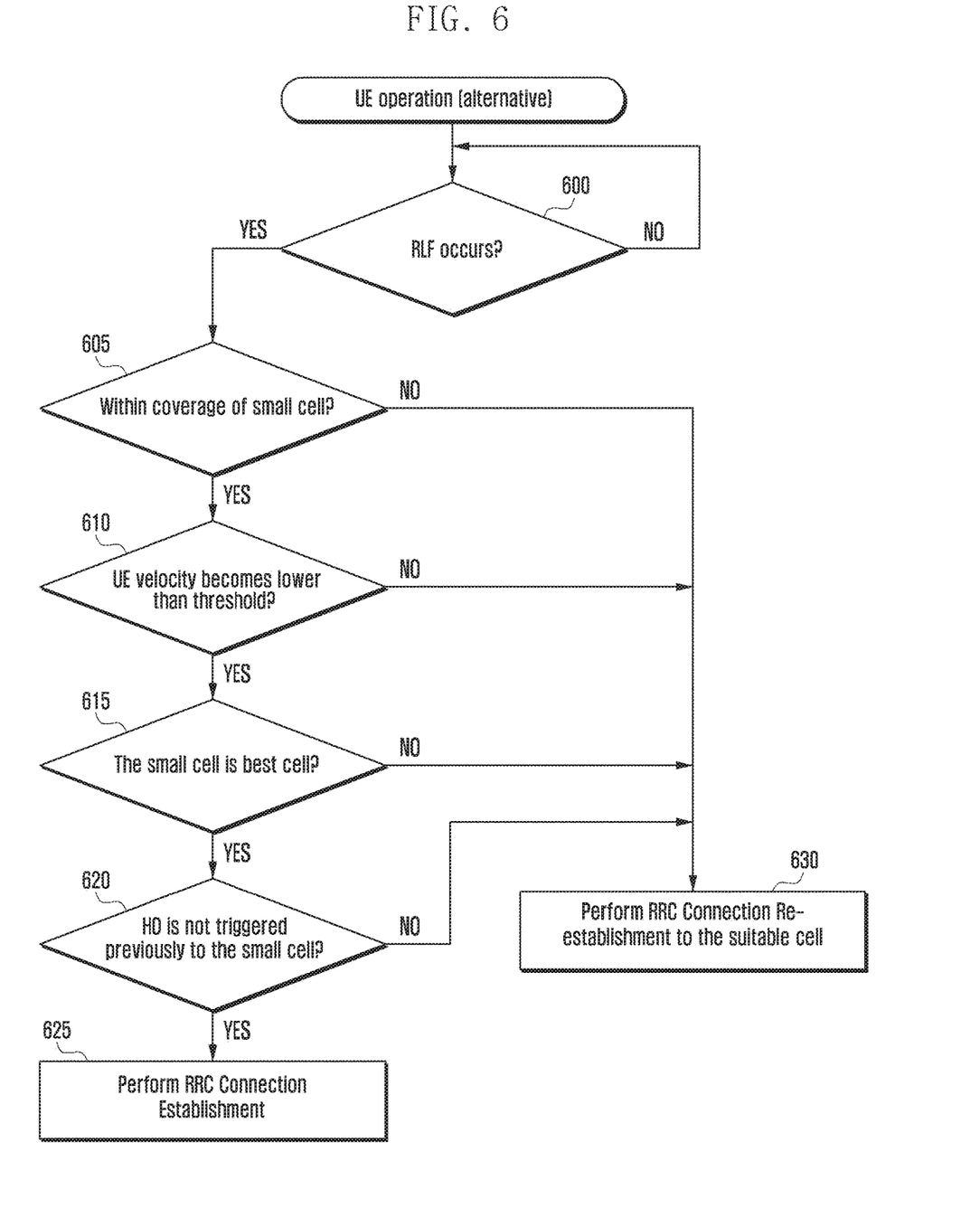
FIG. 6 is a view for describing operations of a UE when a non-HO indicator is not used in the second embodiment.

FIG. 6 is a view for describing operations of a UE when a non-HO indicator is not used. The method for skipping a handover without newly defining a non-HO indicator also has been described earlier. When the UE knows a non-HO indicator and a cell ID of a small cell to be skipped, the UE can determine whether the UE has received a non-HO indicator before a particular time, or can compare a cell ID of the small cell with a cell ID of a suitable cell and, when an RLF occurs, determine whether to perform a re-establishment process. But, although a non-HO indicator is not defined, the eNB may not order the UE to perform a handover on the basis of the prior art. In a case where such a method is used, when an RLF occurs, a new method is needed in order not to perform a re-establishment process within a small cell service area. That is, the UE decides whether to perform a re-establishment process by itself, according to a predetermined condition. The conditions have been listed earlier, and FIG. 6 describes operations in which the UE compares each condition with every other condition. In step 600, the UE determines whether an RLF has occurred. In step 605, the UE determines whether the UE is within a service area of a small cell, as a first condition. In step 610, the UE determines whether a moving speed of the UE is lower than a predetermined threshold value, as a second condition. In step 615, the UE determines whether a small cell is an optimal cell (or a suitable cell), as a third condition. In step 620, the UE determines whether a handover to a small cell has been previously triggered, as a fourth condition. When any of the four conditions mentioned above is not satisfied, the UE performs a re-establishment process in step 630. When all four conditions mentioned above are satisfied, the UE can perform an establishment process in step 625. In an actual implementation, several conditions can be omitted or newly added from among the conditions listed above.

Operations of the eNB according to the present embodiment can be identical to those of FIG. 5, excluding step 515 in an operation of the eNB according to the first embodiment. In the present embodiment, although the eNB determines to skip a handover unlike step 515 of FIG. 5, the eNB does not send any RRC message to a UE. The UE which has not received any message will not naturally perform a handover.

Embodiment 3

Figure 7:
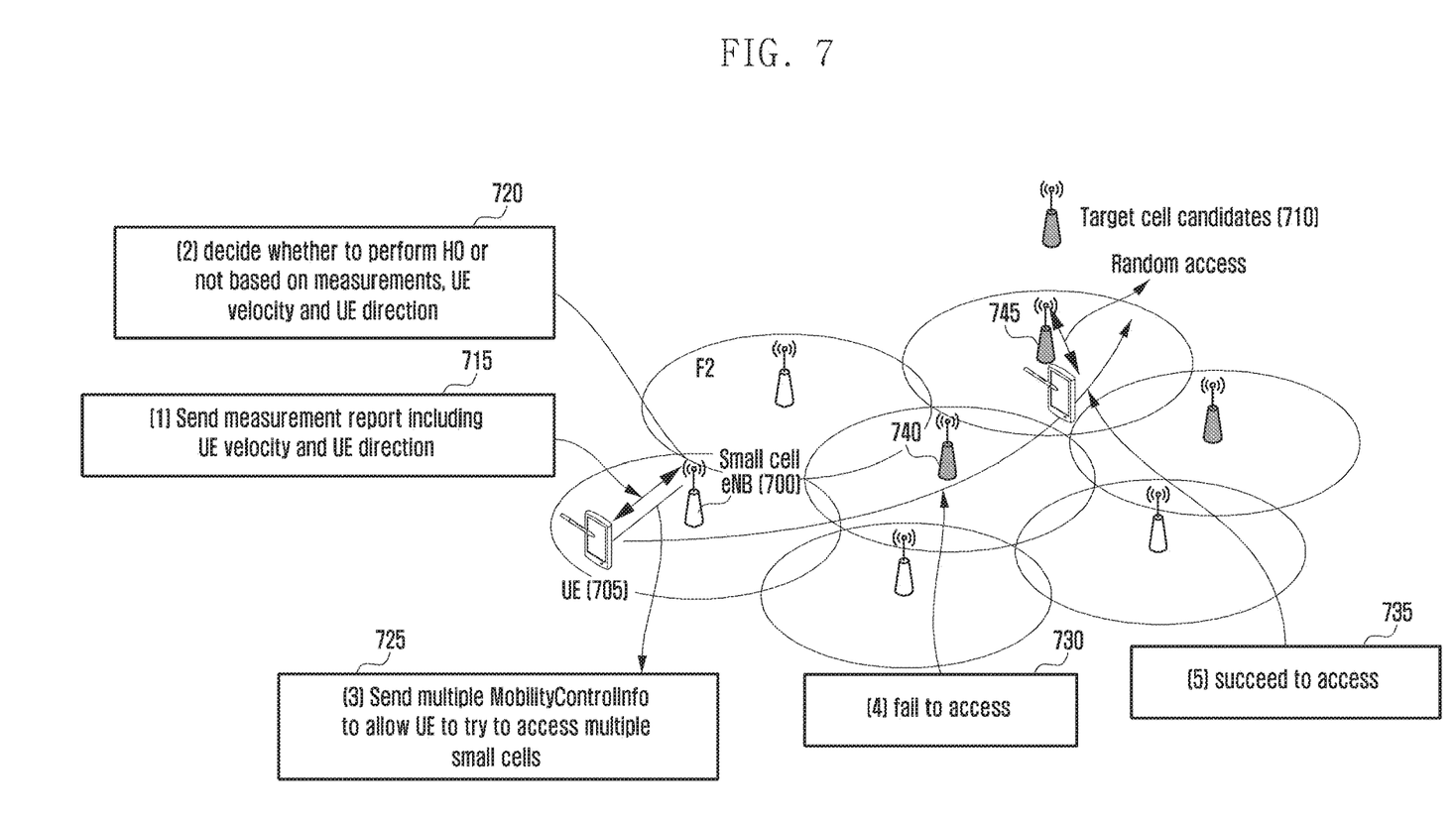
FIG. 7 is a view for describing a method for reducing a probability of failure of handover in a scenario in which a plurality of small cells are densely arranged while being adjacent each other.

FIG. 7 is a view for describing a method for reducing a probability of failure of handover in a scenario in which a plurality of small cells are densely arranged, while being adjacent each other. When a UE moving at a high speed an area in which small cells are concentrated is informed of one target cell according to the prior art, the UE is likely to get out of another cell other than the target cell before a handover is completed. This means, in short, failure of a handover. A method for ultimately removing such a probability of failure is to inform the UE of a plurality of target cells. The present invention proposes a procedure for informing the UE of a plurality of target cells in a LTE standard technology.

A UE 705 reports a result of the measurement to a current serving cell 700 in step 715. The result of the measurement may include moving speed information and moving direction information of a UE, signal intensity information (RSRP/RSRQ) of a serving cell and adjacent cell, PCI information of an adjacent cell, location information of the UE, and the like. A source cell eNB 700 determines whether to provide a plurality of target cells to the UE, using the information on the result of the measurement in step 720. When a usual handover process is configured, the UE performs DL synchronization with an indicated target cell, re-establishes/resets a Packet Data Convergence Protocol (PDCP)/Radio Link Control (RLC)/Media Access Control (MAC), and applies a new AS key. After the UE performs a random access process, the UE maintains a count value with regard to a bearer of an RLC Acknowledge Mode (AM), and after a handover is completed, the UE transmits a PDCP status report. In the present invention, the serving cell provides a plurality of mobility control information in step 725. Each piece of mobility control information corresponds to handover configuration information of one target cell. The UE moving at a high speed tries to access a first target cell 740 and fail to access the first target cell in step 730, but the UE can try to access a second target cell 745 and succeed in accessing the second target cell in step 735. The UE performs DL synchronization with an optimal target cell from among target cells, re-establishes/resets a Packet Data Convergence Protocol (PDCP)/Radio Link Control (RLC)/Media Access Control (MAC) in accordance with L2 configuration information of the optimal target cell, generates and applies an AS key for the optimal target cell, and performs a random access process. Even after a count of a RLC AM bearer is reset to 0 and a handover is performed, a PDCP status report is not generated. Table 1 below shows one example of a LTE ASN.1 sentence which configures a plurality of mobility control information according to the present embodiment.

TABLE 1

MobilityControlInfo information element

Figure 8:
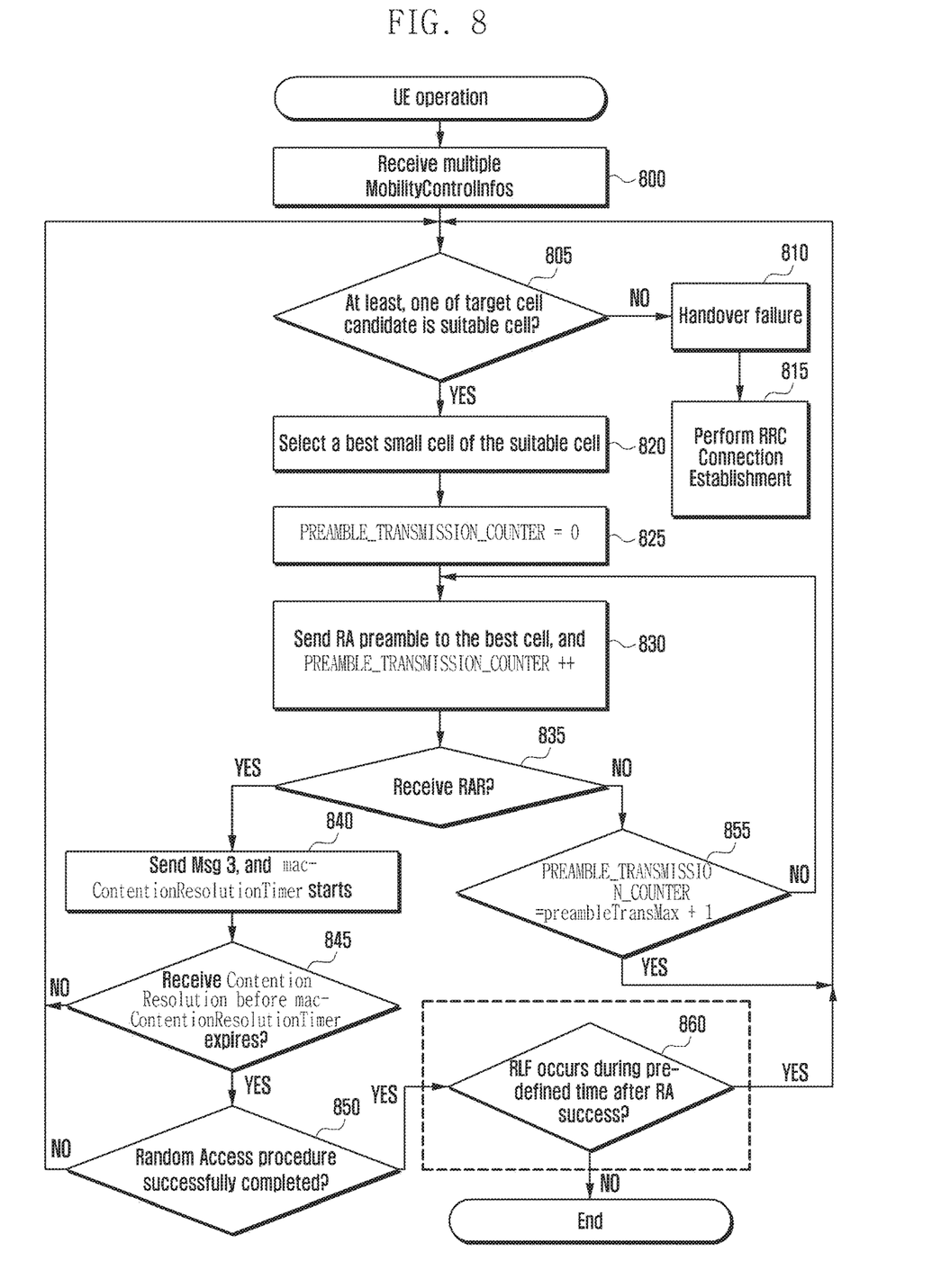
FIG. 8 is a view for describing operations of a UE according to a third embodiment.

-- MobilityControlInfoList-r12 ::= SEQUENCE (SIZE (1..maxHOCell- r12)) OF MobilityControlInfo
   MobilityControlInfo ::= SEQUECE {
   targetPhysCellIdPhysCellId,
   carrierFreqCarrierFreqEUTRAOPTIONAL, -- Cond HO-
   to EUTRA
   carrierBandwidthCarrierBandwidthEUTRAOPTIONAL, -- Cond HO-
   to EUTRA
   additionalSpectrumEmissionAdditionalSpectrumEmissionOPTIONAL
, -- Cond HO
   to EUTRA
   t304ENUMERATED {
   ms50, ms100, ms150, ms200, ms500, ms1000,
   ms2000, spare1},
   newUE-IdentityC-RNTI,
   radioResourceCinfifCommonRadioResourceConfigCommon,
   rach-ConfigDedicatdRACH-ConfigDedicatedOPTIONAL, -- Need
   OP
   ...
}
   CarierBandwidthEUTRA ::=SEQUENCE {
   dl-BandwidthENUMERATED {
   n6, n15, ,25, ,50, ,75, n100, spare10,
   spare9, spare8, spare7, spare6, spare5,
   spare4, spare3, spare2, spare1},
   ul-BandwidthENUMERATED {
   n6, n15, ,25, ,50, ,75, n100, spare10,
   spare9, spare8, spare7, spare6, spare5,
   spare4, spare3, spare2, spare1} OPTIONAL -- Need OP
}
   CarrierFreqEUTRA :: =SEQUENCE {
   dl-CarrierFreqARFCN-ValuEUTRA,
   ul- CarrierFreqARFCN-ValuEUTRAOPTIONAL -- Cond FDD
}
--ASNISTOP FIG. 8 is a view for describing operations of a UE according to the third embodiment. In step 800, the UE receives a plurality of mobility control information from an eNB. In step 805, the UE determines whether at least one target cell is a suitable cell from among a plurality of target cells. When none of the target cells is a suitable cell, the UE considers that a handover fails to be performed in step 810, and performs an RRC Connection Establishment process in step 815. In step 820, the UE selects a small cell providing the most favorable signal intensity from among a plurality of suitable cells. In step 825, the UE sets the value of PREAMBLE_TRANSMISSION_COUNTER to 0. In step 830, the UE transmits a Random Access Preamble to the selected small cell, and increases the value of PREAMBLE_TRANSMISSION_COUNTER by 1. In step 835, the UE determines whether the UE has received a Random Access Response (RAR) from the eNB within a predetermined time interval. When the UE has not received the Random Access Response from the eNB, the UE determines whether the value of PREAMBLE_TRANSMISSION_COUNTER is larger than a predetermined value of preambleTransMax+1, and when the value of PREAMBLE_TRANSMISSION_COUNTER is not larger than the predetermined value of preambleTransMax+1, the UE transmits the Random Access Preamble again in step 830. On the other hand, when the value of PREAMBLE_TRANSMISSION_COUNTER exceeds the threshold value, the UE returns to step 805 and finds a new suitable cell from among a plurality of target cells. When the UE has received the Random Access Response (RAR) within a predetermined time interval, the UE transmits a message 3 (Msg 3) to the eNB and launches one timer such as a mac-Contention Resolution Timer in step 840. In step 845, the UE determines whether the UE has received a Contention Resolution before the timer value is expired. When the UE has not received the Contention Resolution before the timer value is expired, the UE considers that the handover to the selected small cell fails to be performed, returns to step 805, and finds a new suitable cell from among the plurality of target cells. When the UE successfully receives the Contention Resolution, the UE finally determines whether the Random Access (RA) is successfully completed in step 850. When the random access fails to be completed, the UE returns to step 805. When the random access is successfully completed, the UE can determine whether an RLF occurs within a predetermined time interval in step 860, as an optional operation. When an RLF occurs, the UE can return to step 805.

Figure 9:
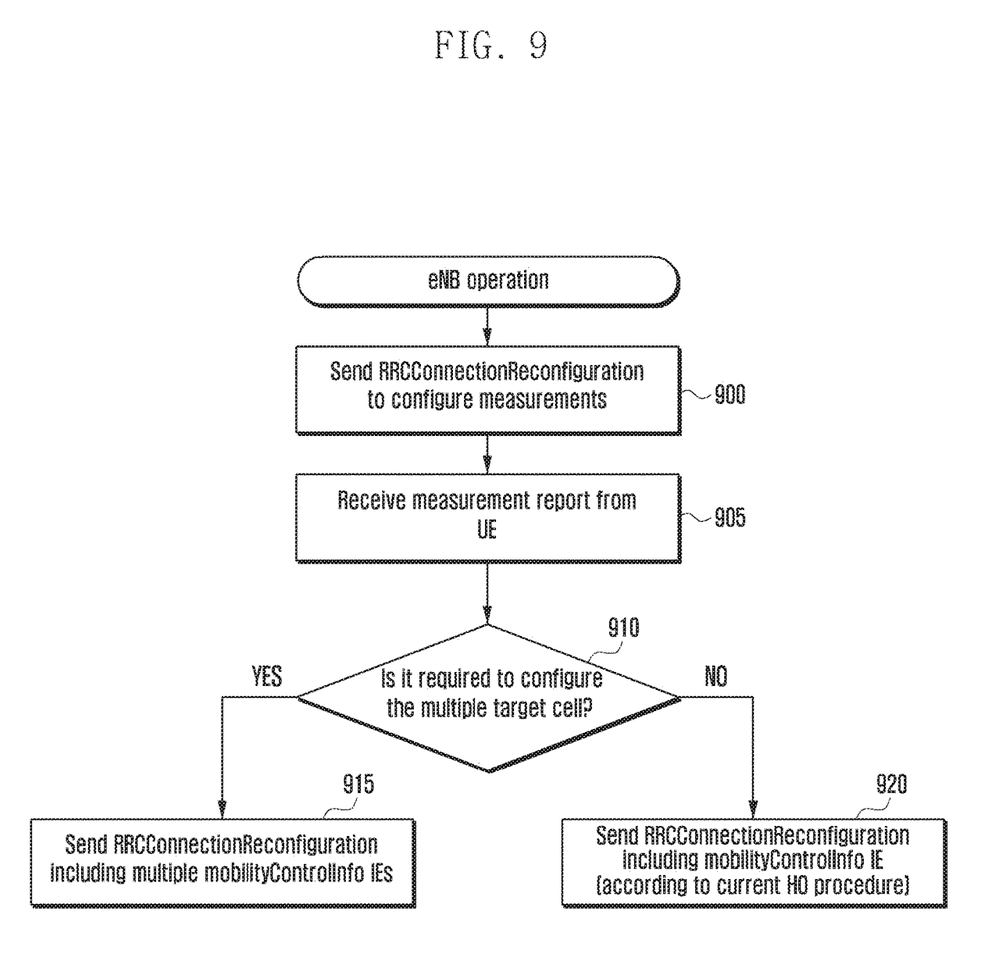
FIG. 9 is a view for describing operations of an eNB according to the third embodiment.

FIG. 9 is a view for describing operations of an eNB according to the third embodiment. In step 900, the eNB transmits an RRC Connection Reconfiguration message for ordering a UE to perform a measurement operation. In step 905, the eNB receives a report for a result of the measurement operation from the UE. In step 910, the eNB configures a plurality of target cells, and determines whether to configure an operation for performing handover to one of the plurality of target cells with regard to the UE, on the basis of the result of the measurement operation. When it is determined that configuration of the plurality of target cells are needed, the eNB transmits an RRC Connection Reconfiguration message including a plurality of mobility control information to the UE in step 815. When configuration of the plurality of target cells is not needed, the eNB transmits an RRC Connection Reconfiguration message including a plurality of mobility control information to the UE according to a usual procedure in step 920.

Figure 10:
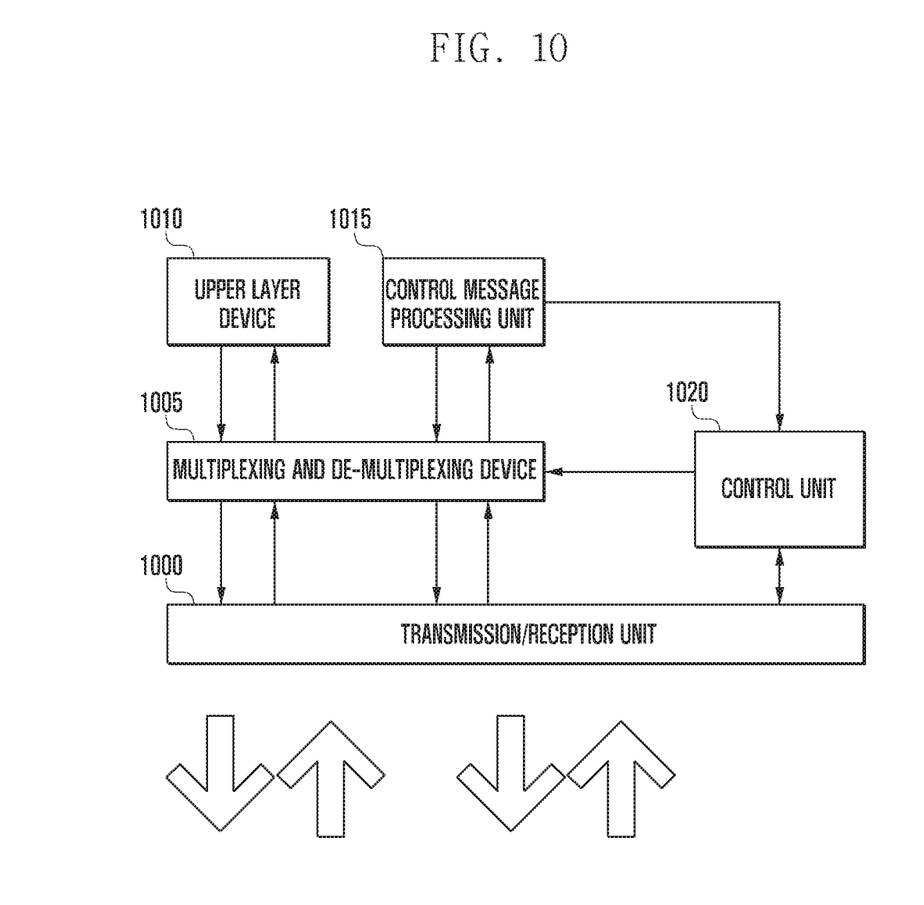
FIG. 10 is a block diagram illustrating an internal structure of a UE to which the present invention is applied.

FIG. 10 is a block diagram illustrating an internal structure of a UE to which the present invention is applied.

The UE transmits and receives an upper layer 1010, data, and the like, and transmits and receives control messages through a control message processing unit 1015. Further, when the UE transmits a control signal or data to an eNB, the UE multiplexes the data through a multiplexing device 1005 and then transmits the data through a transmitter 1000 under the control of a control unit 1020. In contrast, when the UE receives a control signal or data from the eNB, the UE receives a physical signal through a receiver 1000 under the control of the control unit 1020, de-multiplexes the received signal through a de-multiplexing device 1005, and transfers the received signal to the upper layer 1010 or the control message processing unit 1015 separately according to message information.

Figure 11:
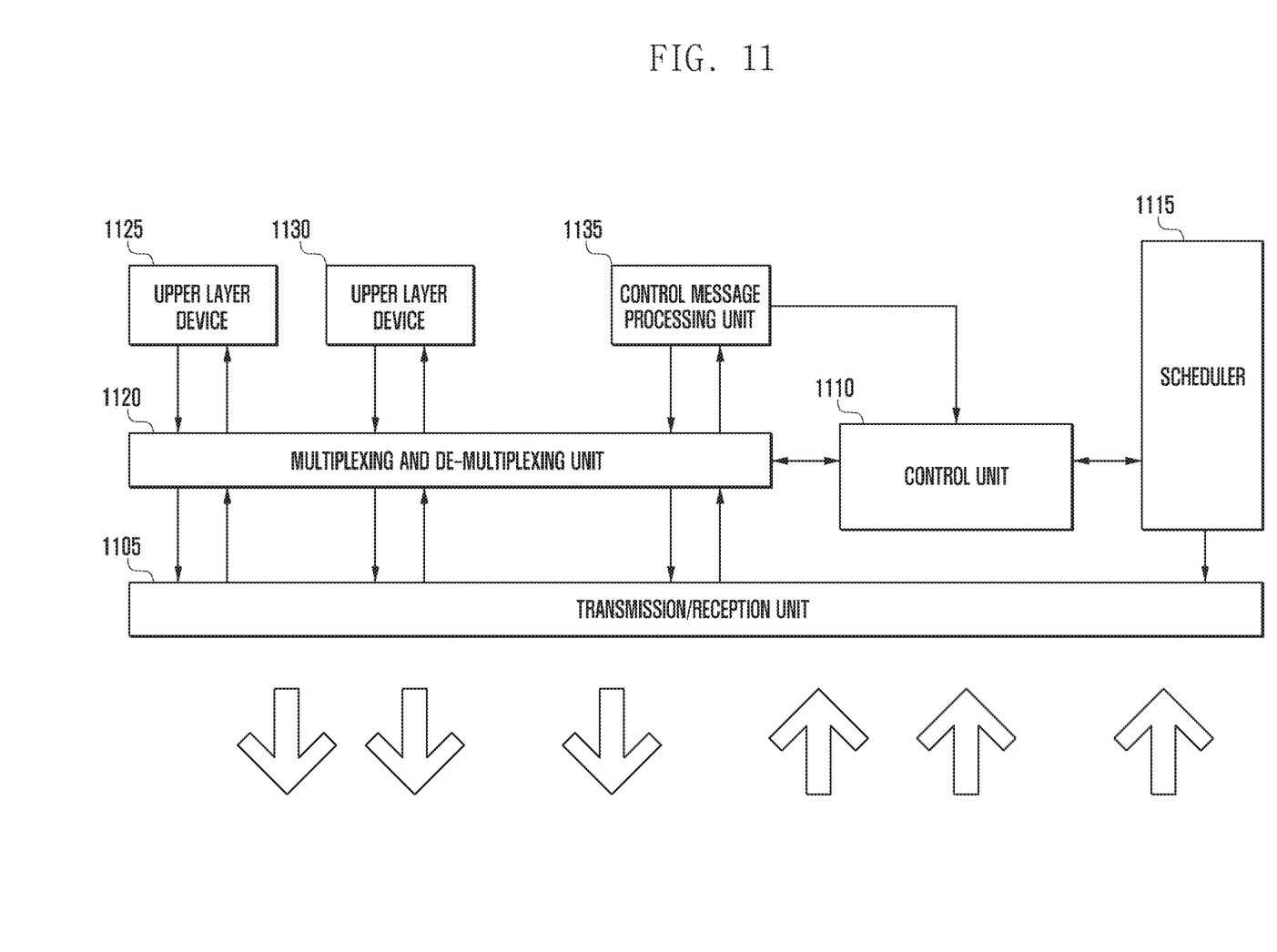
FIG. 11 is a block diagram showing the configuration of an eNB according to the present invention.

FIG. 11 is a block diagram showing the configuration of an eNB according to one embodiment of the present invention, and an eNB device of FIG. 11 includes a transmission/reception unit 1105, a control unit 1110, a multiplexing and de-multiplexing unit 1120, a control message processing unit 1135, all sorts of upper layer processing units 1125 and 1130, and a scheduler 1115. The transmission/reception unit 1105 transmits data and a predetermined control signal through a forward carrier and receives data and a predetermined control signal through a backward carrier. In a case where a plurality of carriers is set, the transmission/reception unit 1105 transmits and receives data and a control signal through the plurality of carriers. The multiplexing and de-multiplexing unit 1120 multiplexes data generated by the upper layer processing units 1125 and 1130 or the control message processing unit 1135 or de-multiplexes data received from the transmission/reception unit 1105 and transfers the de-multiplexed data to the appropriate upper layer processing units 1125 and 1130, the control message processing unit 1135, or the control unit 1110. The control unit 1110 determines whether to apply a band-specific measurement gap to a particular UE, and determines whether to include the configuration information in an RRC Connection Reconfiguration message. The control message processing unit 1135 receives an indication from a control unit, and generates an RRC Connection Reconfiguration message to be transmitted to a UE and transfers the RRC Connection Reconfiguration message to a lower layer. The upper layer processing units 925 and 930 may be configured according to each UE or according to each service, and processes data generated by a user service such as File Transfer Protocol (FTP) or Voice over Internet Protocol (VoIP) and transfers the data to a multiplexing and de-multiplexing unit 920, or processes data transferred from the multiplexing and de-multiplexing unit 920 and transfers the data to a service application of an upper layer. The scheduler 915 allocates a transmission resource to a UE at a proper time point in consideration of a buffer state and a channel state of the UE, an active time of the UE, and the like, and allows the transmission/reception unit to process a signal which the UE has transmitted or allows the UE to transmit a signal.

It is apparent that those skilled in the art can embody the present invention in different forms without departing from the sprit and essential feature of the present invention.

Therefore, the detailed descriptions should not be construed to be limited in all aspects, but should be considered to be an example. The scope of the present invention should be determined by rational interpretation of the appended claims, and all modifications within a range equivalent to the present invention should be construed as being included in the scope of the present invention.

What is claimed is:

1. A method by a terminal in a mobile communication system, the method comprising:
   receiving a control message including information on configuration of a plurality of target cells;
   determining one of the plurality of target cells based on the information;
   performing a random access procedure for a handover on the determined target cell and starting a first timer;
   in case of a failure of the random access procedure for the handover on the determined target cell, starting a second timer when the first timer is expired, and selecting a suitable cell while the second timer is running; and
   performing a random access procedure for a handover on the selected cell in case that the selected cell is included in the plurality of target cells based on the information.

2. The method of claim 1, further comprising:
   performing a measurement operation; and
   transmitting a result of the measurement operation,
   wherein the plurality of target cells are determined by a base station based on the result of the measurement operation.

3. A method by a base station in a mobile communication system, the method comprising:
   determining a plurality of target cells for a handover of a terminal; and
   transmitting a control message including information on configuration of the plurality of target cells,
   wherein a random access procedure for a handover on one of the plurality of target cells based on the information is performed by the terminal,
   wherein a first timer is started when the random access procedure for the handover on the one of the plurality of target cells is performed,
   wherein a random access procedure for a handover on a selected cell is performed by the terminal in case that the selected cell is included in the plurality of target cells based on the information in case of a failure of the random access procedure for the handover on the one of the plurality of target cells, and
   wherein a second timer is started when the first timer is expired, and the selected cell is selected while the second timer is running.

4. The method of claim 3, further comprising:
   receiving a result of a measurement operation of the terminal,
   wherein the plurality of target cells are determined based on the result of the measurement operation.

5. A terminal in a mobile communication system, comprising:
   a transceiver; and
   at least one processor coupled with the transceiver and configured to control to:
      receive a control message including information on configuration of a plurality of target cells,
      determine one of the plurality of target cells based on the information,
      perform a random access procedure for a handover on the determined target cell and start a first timer,
      in case of a failure of the random access procedure for the handover on the determined target cell, start a second timer when the first timer is expired, and select a suitable cell while the second timer is running, and
      perform a random access procedure for a handover on the selected cell in case that the selected cell is included in the plurality of target cells based on the information.

6. The terminal of claim 5, wherein the at least one processor is further configured to control to:
   perform a measurement operation, and
   transmit a result of the measurement operation,
   wherein the plurality of target cells are determined by a base station based on the result of the measurement operation.

7. A base station in a mobile communication system, comprising:

a transceiver; and at least one processor coupled with the transceiver and configured to control to:

determine a plurality of target cells for a handover of a terminal, and transmit a control message including information on configuration of the plurality of target cells, wherein a random access procedure for a handover on one of the plurality of the target cells based on the information is performed by the terminal, wherein a first timer is started when the random access procedure for the handover on the one of the plurality of target cells is performed, wherein a random access procedure for a handover on a selected cell is performed by the terminal in case that the selected cell is included in the plurality of the target cells based on the information in case of a failure of the random access procedure for the handover on the one of the plurality of target cells, and wherein a second timer is started when the first timer is expired, and the selected cell is selected while the second timer is running.

8. The base station of claim 7, wherein the at least one processor is further configured to control to:

receive a result of a measurement operation of the terminal, wherein the plurality of target cells are determined based on the result of the measurement operation.

\* \* \* \* \*